United States Patent
Yanagi

(10) Patent No.: US 8,068,955 B2
(45) Date of Patent: Nov. 29, 2011

(54) VEHICLE WITH A VARIABLE REAR TOE ANGLE

(75) Inventor: Takashi Yanagi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 472 days.

(21) Appl. No.: 12/349,852

(22) Filed: Jan. 7, 2009

(65) Prior Publication Data

US 2009/0177348 A1 Jul. 9, 2009

(30) Foreign Application Priority Data

Jan. 8, 2008 (JP) ................................. 2008-001691
Jan. 9, 2008 (JP) ................................. 2008-002234

(51) Int. Cl.
*B62D 6/00* (2006.01)

(52) U.S. Cl. .................... 701/43; 701/29; 280/86.758

(58) Field of Classification Search ............... 701/29, 701/34, 41, 43; 180/404, 411; 280/86.758
See application file for complete search history.

(56) References Cited

U.S. PATENT DOCUMENTS

| | | | | |
|---|---|---|---|---|
| 4,970,647 | A * | 11/1990 | Karadsheh et al. ............ | 701/43 |
| 5,026,081 | A * | 6/1991 | Bauer ........................... | 180/412 |
| 5,143,400 | A * | 9/1992 | Miller et al. ................. | 280/5.522 |
| 5,195,601 | A * | 3/1993 | Voigt et al. ................... | 180/412 |
| 5,346,030 | A * | 9/1994 | Ohmura et al. ............... | 180/412 |
| 5,810,108 | A * | 9/1998 | Jung et al. .................... | 180/404 |
| 6,283,483 | B1 * | 9/2001 | Johnson et al. .......... | 280/86.758 |
| 6,991,061 | B2 * | 1/2006 | Laurent ........................ | 180/402 |
| 7,416,264 | B2 * | 8/2008 | Tsukasaki .................... | 303/189 |
| 7,740,102 | B2 * | 6/2010 | Tsukasaki .................... | 180/408 |
| 7,871,085 | B2 * | 1/2011 | Sasaki ........................ | 280/5.524 |
| 7,873,440 | B2 * | 1/2011 | Horiuchi et al. ............. | 700/279 |
| 7,912,606 | B2 * | 3/2011 | Auguet ........................ | 701/41 |
| 2004/0140147 | A1 * | 7/2004 | Laurent ....................... | 180/402 |
| 2005/0178606 | A1 * | 8/2005 | Husain et al. ................ | 180/408 |
| 2008/0051941 | A1 * | 2/2008 | Horiuchi et al. ............. | 700/279 |
| 2008/0054577 | A1 * | 3/2008 | Horiuchi .................... | 280/5.522 |
| 2009/0177348 | A1 * | 7/2009 | Yanagi ......................... | 701/29 |
| 2009/0243237 | A1 * | 10/2009 | Sasaki ........................ | 280/5.524 |
| 2010/0023217 | A1 * | 1/2010 | Horiuchi et al. ............. | 701/42 |
| 2010/0204888 | A1 * | 8/2010 | Nishioka ..................... | 701/41 |
| 2010/0263961 | A1 * | 10/2010 | Horiuchi ..................... | 180/445 |

FOREIGN PATENT DOCUMENTS

JP 9-030438 2/1997
WO WO 2007003661 A1 * 1/2007

* cited by examiner

*Primary Examiner* — Darnell Jayne
*Assistant Examiner* — Joshua Rodden
(74) *Attorney, Agent, or Firm* — Rankin, Hill & Clark LLP

(57) ABSTRACT

In a vehicle provided with a rear wheel toe angle varying device for individually varying toe angles of rear wheels, upon detection of a failure to steer one of the rear wheels, the rear wheel of a healthy side is steered to a zero angle. Whereby, when a straight travel determining unit determines that the vehicle is traveling straight, a toe angle estimating unit estimates a steering angle of the rear wheel which has failed to steer based upon the steering angle of the front wheels of the vehicle as determined by a steering angle sensor.

5 Claims, 13 Drawing Sheets

VEHICLE WITH A VARIABLE REAR TOE ANGLE

TECHNICAL FIELD

The present invention relates to a vehicle that is provided with a rear wheel toe angle varying device for individually varying toe angles of rear wheels.

BACKGROUND OF THE INVENTION

Each front wheel of a four-wheel vehicle is provided with a certain fixed toe angle with the aim of ensuring a driving stability of the vehicle, in addition to a steering angle which is varied as required for changing the traveling direction of the vehicle. In recent years, there have been proposals to equip a vehicle with a device for varying the toe angles of the rear wheels to the end of improving the driving stability and response.

Japanese patent publication No. 9-030438 discloses a device that includes a pair of electric linear actuators each provided at a junction between a lateral link or a trailing link of a corresponding side a vehicle suspension system and the vehicle body so that the toe angle of the rear wheels may be varied individually.

It was also proposed in Japanese patent publication No. 2008-04981 (by the inventor of the present application and two others, and corresponds to U.S. patent application Ser. No. 11/830,391 and EP patent No. 1892180B) to control the toe angles of the rear wheels to be symmetric to each other or otherwise come to agree with each other if the control of either one of the toe angles becomes faulty or incapacitated for any reason.

However, according to the previous proposal in the aforementioned Japanese patent publication, when a rear wheel of a faulty side is seized or get stuck at a certain angle, it may be possible to keep the vehicle travelling straight ahead but the tires of the rear wheels are subjected to uneven or excessive wears.

BRIEF SUMMARY OF THE INVENTION

In view of such problems of the prior art, a primary object of the present invention is to provide a vehicle provided with a rear wheel toe angle varying device for individually varying toe angles of rear wheels that enables the vehicle to continue to travel with a minimum inconvenience even in case of a failure in properly steering the rear wheels.

A second object of the present invention is to provide a vehicle provided with a rear wheel toe angle varying device for individually varying toe angles of rear wheels that enables the vehicle to continue to travel without regard to the nature of the cause of the fault even in case of a failure in properly steering the rear wheels.

According to the present invention, such objects can be at least partly accomplished by providing a vehicle provided with a rear wheel toe angle varying device for individually varying toe angles of rear wheels. The rear wheel toe angle varying device comprising a pair of drive units for steering the rear wheels, at least one sensor for detecting a status of the vehicle, a control unit for controlling the drive units according to an output of the sensor, and a monitoring unit for detecting a failure to steer each rear wheel as controlled by the control unit. The control unit is configured such that, upon detection of a failure to steer each rear wheel, the rear wheel of a healthy side is steered in a direction to enable the vehicle to travel straight ahead.

Thereby, if one of the rear wheels becomes fixed at a certain toe angle or at an unknown toe angle, by appropriately steering the rear wheel of the healthy side, the vehicle is enabled to travel straight ahead without causing any undue inconvenience to the vehicle operator.

According to the present invention, the failure to steer each rear wheel as controlled by the control unit can be due to any one of a number of different causes. The fault may occur in a stroke sensor that detects an actual steered angle of the corresponding rear wheel, in a power actuator for steering each rear wheel or in a part of the control unit responsible for steering each rear wheel. The present invention can provide a countermeasure without regard to the cause of a failure to steer each rear wheel as controlled by the control unit.

According to a particularly preferred embodiment of the present invention, upon occurrence of a failure to steer one of the rear wheels, the control unit steers the rear wheel of a healthy side in parallel to the rear wheel of the faulty side. Thereby, the vehicle is enabled to travel straight ahead even though the traveling direction of the vehicle is at a certain angle with respect to the longitudinal line of the vehicle body. At this time, the front wheels are typically steered at the same angle as the rear wheels.

Alternatively, upon occurrence of a failure to steer one of the rear wheels, the control unit may steer the rear wheel of a healthy side by a same angle in an opposite direction in relation to the rear wheel of the faulty side. In this case, there is some dragging of the rear wheels, and this causes increased wears to the rear wheels, but the vehicle is enabled to travel straight ahead in parallel with the longitudinal direction of the vehicle body. In this case, the steering angle of the front wheels may be kept at zero.

In some cases, it may not be possible to detect the steered angle of the rear wheel of the faulty side depending on the cause of the fault. Without the knowledge of the steering angle of the rear wheel of the faulty side, it is not possible to determine what is the desired steering angle for the rear wheel of the healthy side. To overcome this problem, the rear wheel toe angle varying device may further comprise a steering angle sensor for detecting a steering angle of front wheels, a straight travel determining unit for determining that the vehicle is traveling straight ahead, and a toe angle estimating unit that, upon occurrence of a failure to steer one of the rear wheels, steers the rear wheel of a healthy side to a zero angle, and estimates a steering angle of the rear wheel of a faulty side from the steering angle of the front wheels when the vehicle is traveling straight ahead. Typically, the toe angle estimating unit estimates the steering angle of the rear wheel of the faulty side to be one half of the steering angle of the front wheels.

Thereby, the control system is enabled to steer the rear wheel of the healthy side to an optimum steering angle based on the estimated steering angle of the rear wheel of the faulty side.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
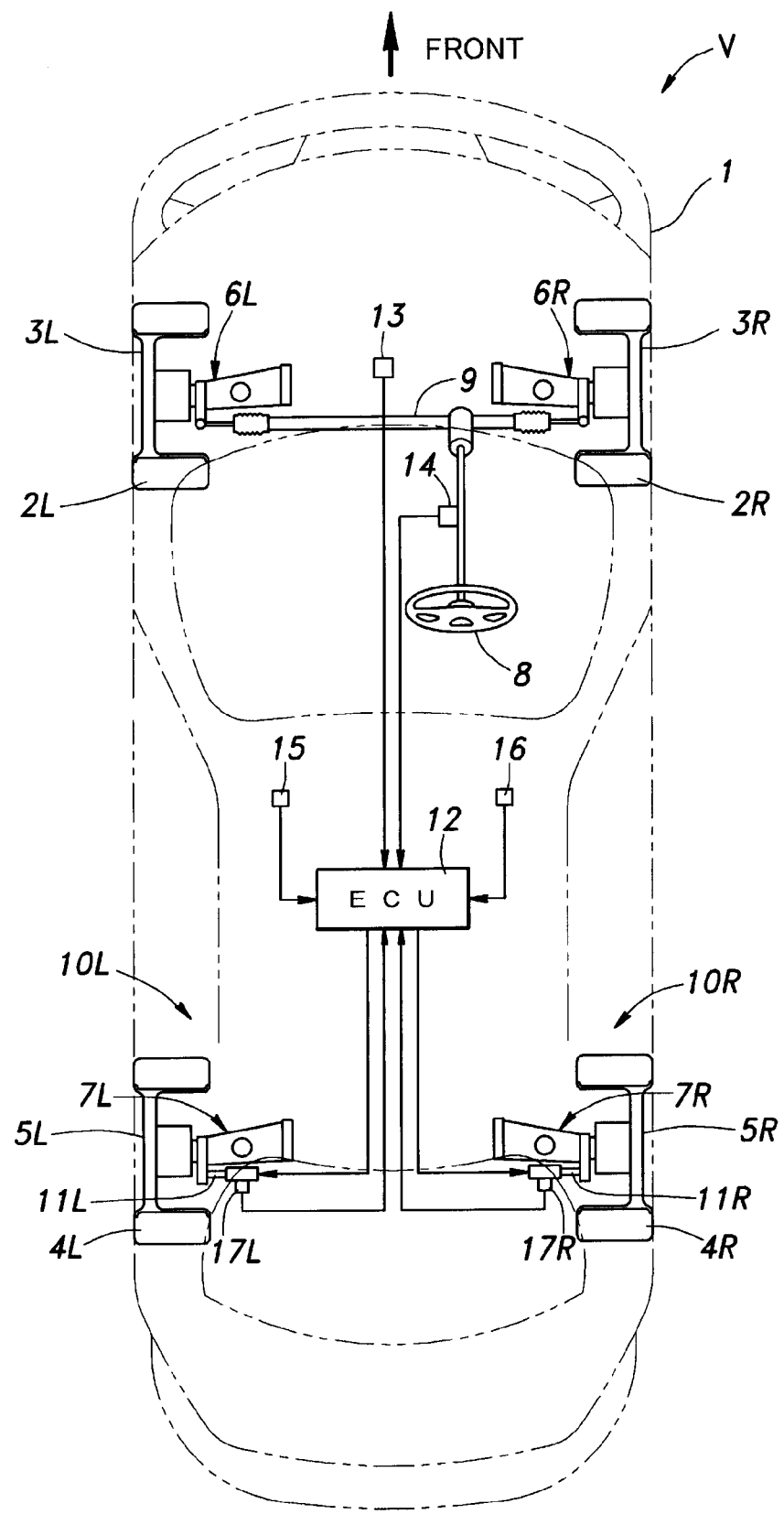
FIG. 1 is a schematic block diagram showing a vehicle equipped with a rear wheel toe angle varying device embodying the present invention.

FIG. 1 shows a vehicle V equipped with a rear wheel toe angle varying device 10, which is divided into two parts 10L and 10R, and embodies the present invention. The vehicle V comprises a pair of front wheels 3L and 3R each fitted with a tire 2L, 2R, and a pair of rear wheels 5L and 5R each fitted with a tire 4L, 4R, and these wheels are supported by a front suspension system 6L and 6R and a rear suspension system 7L and 7R, respectively. Various components of the illustrated vehicle V are provided in pairs, and the ones on the left hand side and right hand side of the vehicle body are indicated by adding the suffixes L and R, respectively, to the numerals denoting such components as a whole. When describing such components, where appropriate, only one of each pair of such components is described and the suffixes for such components are omitted.

The vehicle V further comprises a front wheel steering system 9 that allows the front wheels 3L and 3R to be steered or turned in a conventional manner as a steering wheel 8 is turned manually via a rack and pinion mechanism. The rear wheel toe angle varying device 10 allows the toe angles of the rear wheels 5L and 5R to be turned individually under the control of an ECU 12 which is described hereinafter.

In addition to the ECU 12, the vehicle V is provided with a vehicle speed sensor 13, a steering angle sensor 14, a yaw rate sensor 15, a lateral acceleration sensor 16 and other sensors not shown in the drawings, and the output signals of these sensors are forwarded to the ECU 12 for controlling the various functions of the vehicle V. The steering angle sensor 14 detects the rotational angle of the steering wheel 8, and the steering angle of the front wheels 3 are computed from the output signal thereof.

The ECU 12 includes a microcomputer, ROM, RAM, peripheral circuits, input and output interfaces and various drivers, and is connected to the sensors 13 to 16 and electric actuators 11 for turning or steering the rear wheels 4L and 4R. The ECU 12 is configured to compute required rear wheel toe angles according to the output signals of the various sensors 13 to 16, and determine the displacements of the electric actuators 11L and 11R that are required to achieve the computed rear wheel toe angles.

A stroke sensor 17 is provided in association with each electric actuator 11 for determining the actual toe angle of the corresponding rear wheel 5 by detecting the displacement of the output rod of the corresponding electric actuator 11. The output signals of the stroke sensors 17 are forwarded to the ECU 12 for conducting a feedback control of the electric actuators 11. Thereby, each the output rod of each electric actuator 11 extends and retracts by an amount determined by the ECU 12, and accurately achieves a required toe angle in the corresponding rear wheel 5.

In this vehicle V, by actuating the two electric actuators 11L and 11R simultaneously in a symmetric manner (or in opposite directions), the toe-in and toe-out of the rear wheels 5L and 5R can be freely controlled as desired. Additionally, by actuating the electric actuator in a same direction, the rear wheels 5L and 5R can be steered in either direction. It should be noted that the toe angles of the rear wheels 5L and 5R as used herein mean both the cases where the rear wheels 5L and 5R are turned in the same direction and turned in the opposite directions. For instance, the rear wheels 5L and 5R may be put into a toe out configuration when the vehicle V is accelerating and into a toe in configuration when the vehicle V is decelerating for an improved handling of the vehicle V. Additionally or alternatively, the rear wheels 5L and 5R may be both steered in the same direction as the front wheels when the vehicle V is cornering at a high speed for an improved vehicle stability and in the opposite directions when the vehicle V is cornering at a low speed for an improved responsiveness.

Figure 2:
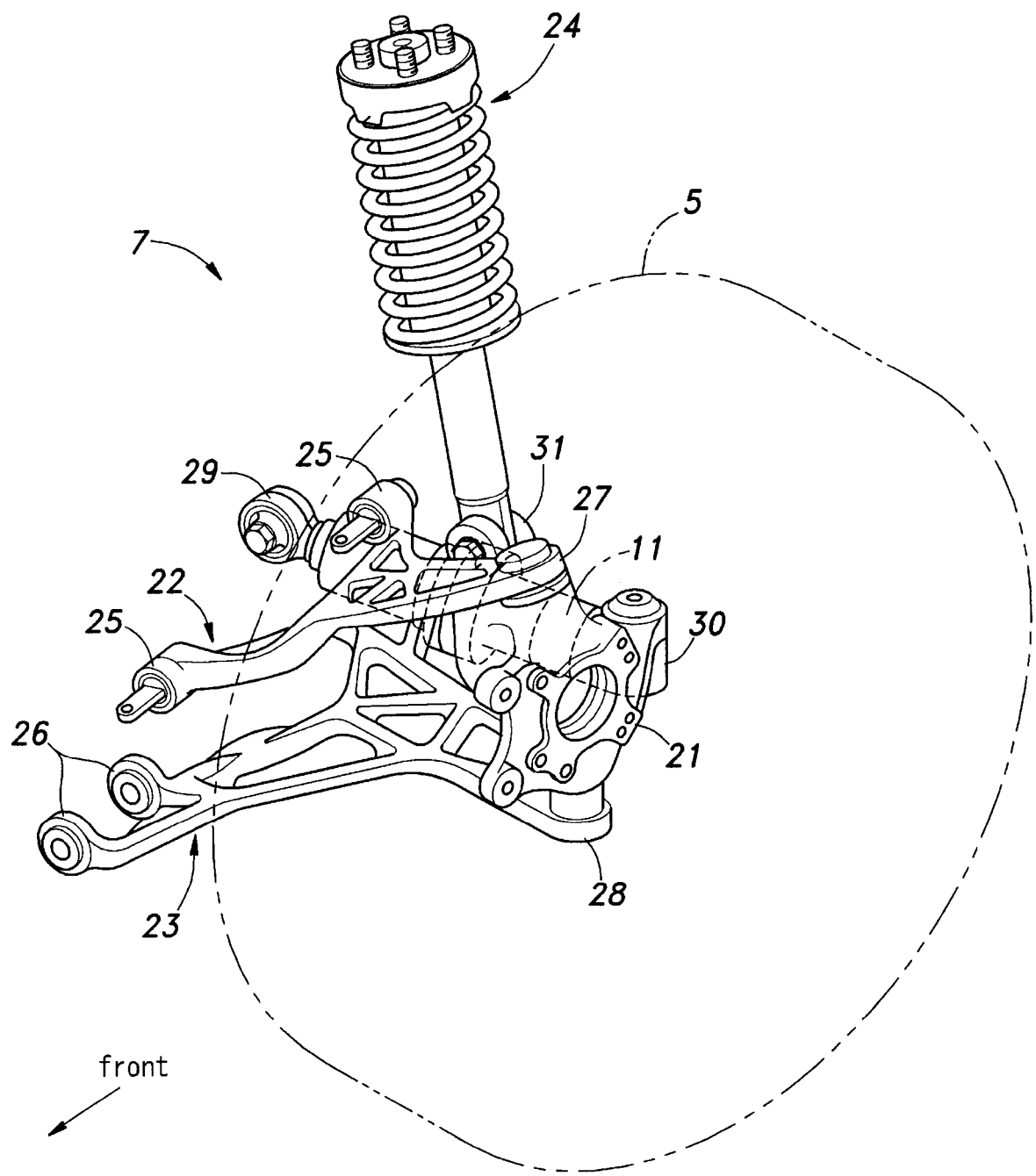
FIG. 2 is a perspective view of a rear suspension system.
Figure 3:
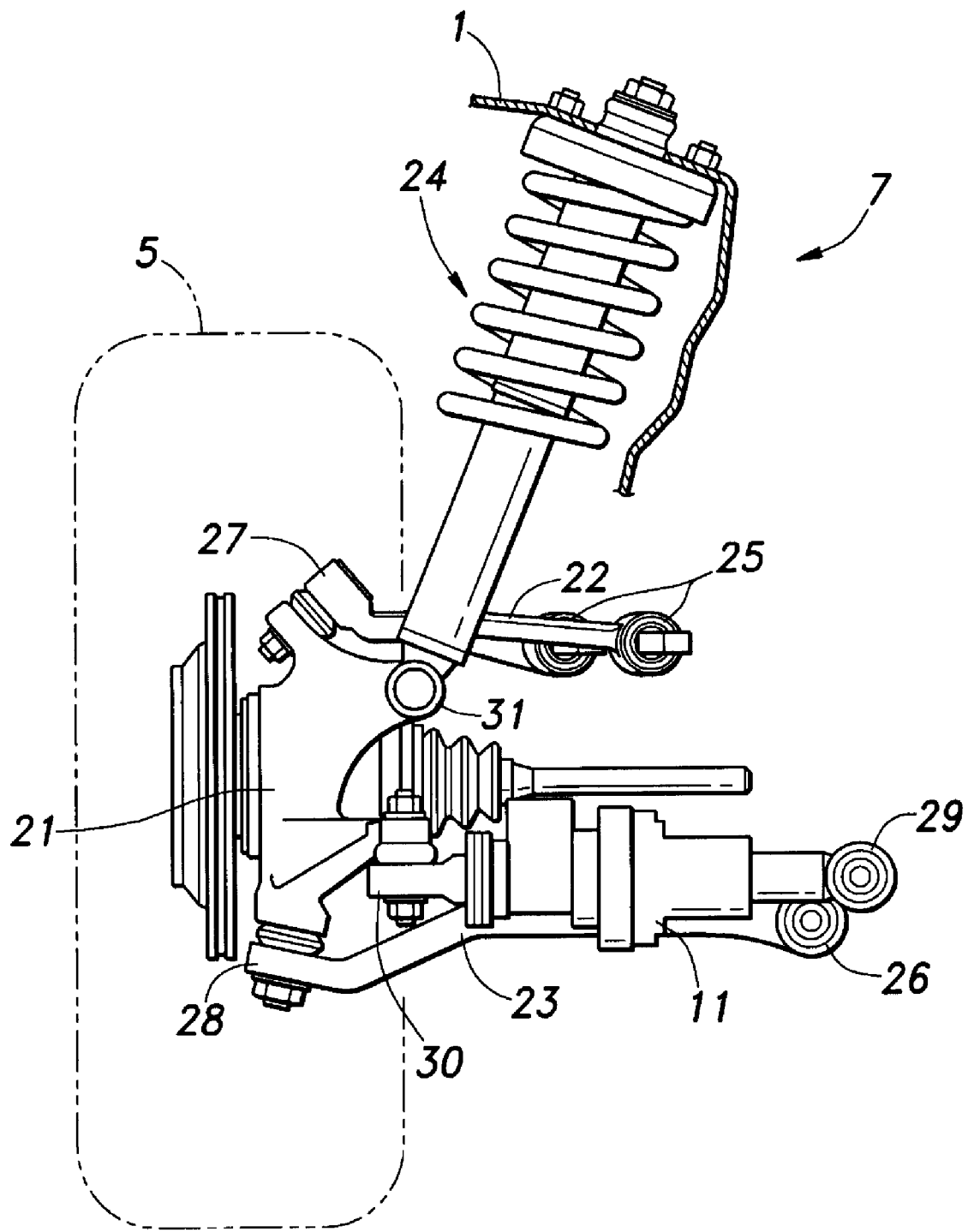
FIG. 3 is a rear view of the rear suspension system.

The detailed structure of the rear wheel toe angle varying device is described in the following with reference to FIGS. 2 and 3. FIG. 2 is a left part of the rear wheel suspension system 7L, and FIG. 3 is a rear view of the same. This rear wheel suspension system 7 is a double wishbone type suspension system which comprises a knuckle 21 rotatably supporting the rear wheel 5, an upper and lower arm 22 and 23 connecting the knuckle 21 to the vehicle body in a vertically moveable manner, an electric actuator 11 connected between the knuckle 21 and vehicle body 1 to vary the toe angle of the rear wheel 5 and a damper 24 including a compression coil spring and a hydraulic damper for damping the vertical movement of the rear wheel 5.

The upper arm 22 is connected to the vehicle body 1 at a base end thereof via a rubber bush joint 25 and to an upper part of the knuckle 21 at a free end thereof via a rubber bush joint 27, and the lower arm 23 is connected to the vehicle body 1 at a base end thereof via a rubber bush joint 26 and to a lower part of the knuckle 21 at a free end thereof via a rubber bush joint 28. Each electric actuator 11 is connected to the vehicle body 1 at a base end thereof via a rubber bush joint 29 and a rear part of the knuckle 21 at a free end thereof via a rubber bush joint 30. The damper 24 is connected to the vehicle body 1 at an upper end thereof, and to an upper part of the knuckle 21 at a lower end thereof via a rubber bush joint 31.

Thus, as each electric actuator 11 extends, the rear part of the corresponding knuckle 21 turns in an outboard direction, and the corresponding rear wheel 5 is turned in an inboard (toe-in) direction. Conversely, as each electric actuator 11 contracts, the rear part of the corresponding knuckle 21 turns in an inboard direction, and the corresponding rear wheel 5 is turned in an outboard (toe-out) direction.

Figure 4:
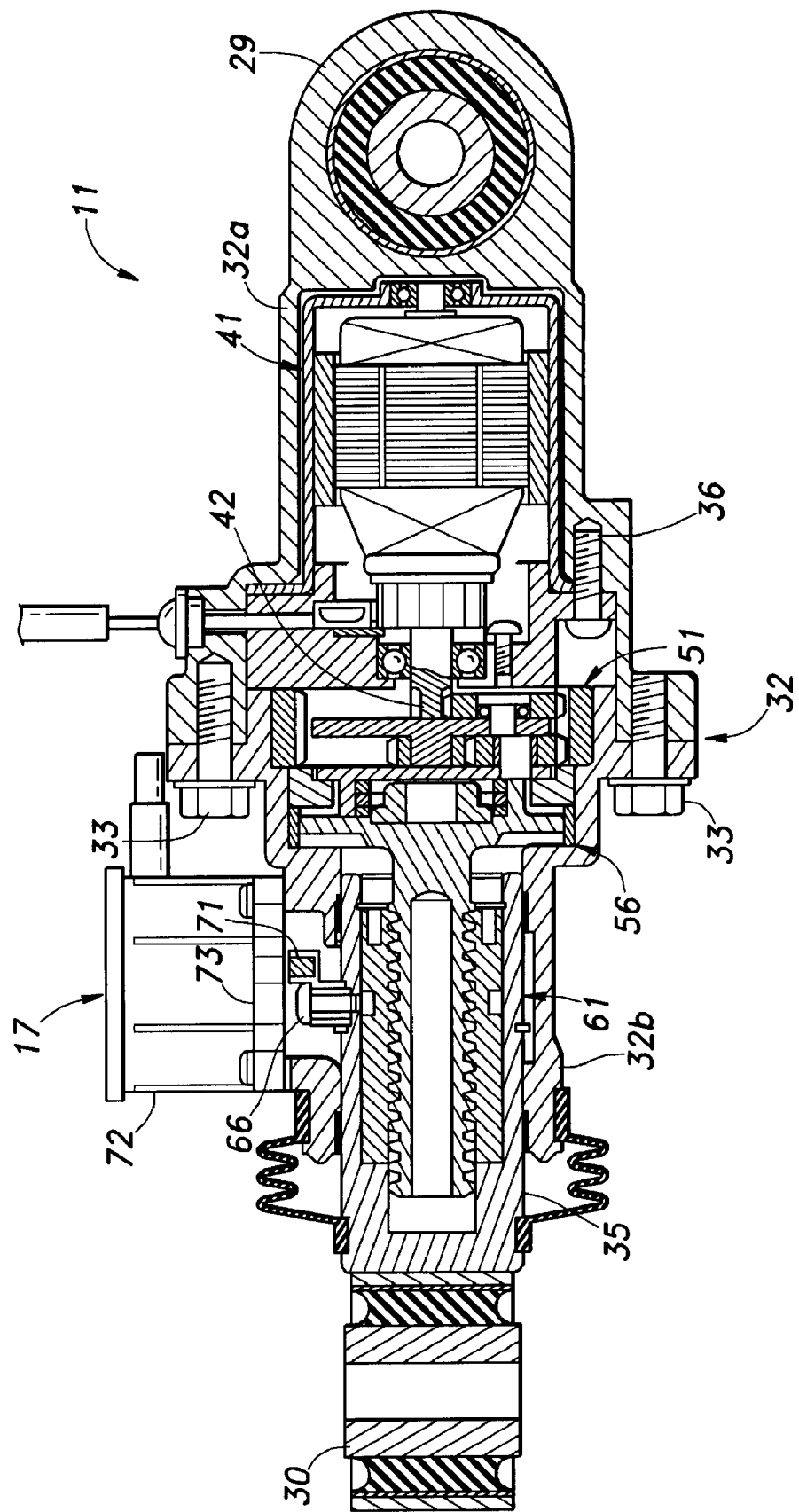
FIG. 4 is a vertical sectional view of an electric actuator for varying the toe angle of each rear wheel.

The electric actuator 11 and stroke sensor 17 are described in the following with reference to FIG. 4 which is a vertical sectional view of the electric actuator 11. The electric actuator 11 comprises a housing 32 including a first housing part 32a incorporated with the rubber bush joint 29 of the vehicle body side and a second housing part 32b joined to the first housing part 32a with a plurality of threaded bolts 33, and an output rod 35 supported by the second housing 32b in an axially slidable manner and incorporated with the rubber bush joint 30 of the knuckle side. The first housing part 32a receives therein a DC electric motor 41 which is fixedly secured to the first housing part 32a by a plurality of threaded bolts 36 and provided with an output shaft 42. The second housing part 32b receives therein a planetary gear type reduction gear unit 51 having an input end connected to the output shaft 42 of the electric motor 41, a flexible shaft coupling 56 connected to an output end of the reduction gear unit 51 and a screw mechanism 61 using a trapezoidal thread connected to the output end of the flexible shaft coupling 56. As the DC electric motor 41 is actuated, the rotation of the output shaft 42 is reduced in speed by the reduction gear unit 51, and converted into a linear movement by the screw mechanism 61 to linearly actuate the output rod 35.

The stroke sensor 17 is attached to an exterior surface of the second housing part 32b, and comprises a magnet 71 fixedly attached to the output rod 35 by a threaded bolt 66 and a differential transformer 73 received in a sensor housing 72 which is in turn fixedly attached to the second housing part 32b. The differential transformer 73 is disposed adjacent to the magnet 71 and extends in parallel with the traveling direction of the output rod 35. The differential transformer 73 includes a primary coil and a pair of secondary coils having a same number of turns so that the movement of the magnet 71 in the traveling direction of the output rod 35 induces voltages in the two secondary coils, and the difference between the induced voltages corresponds to the traveling stroke of the output rod 35.

Figure 5:
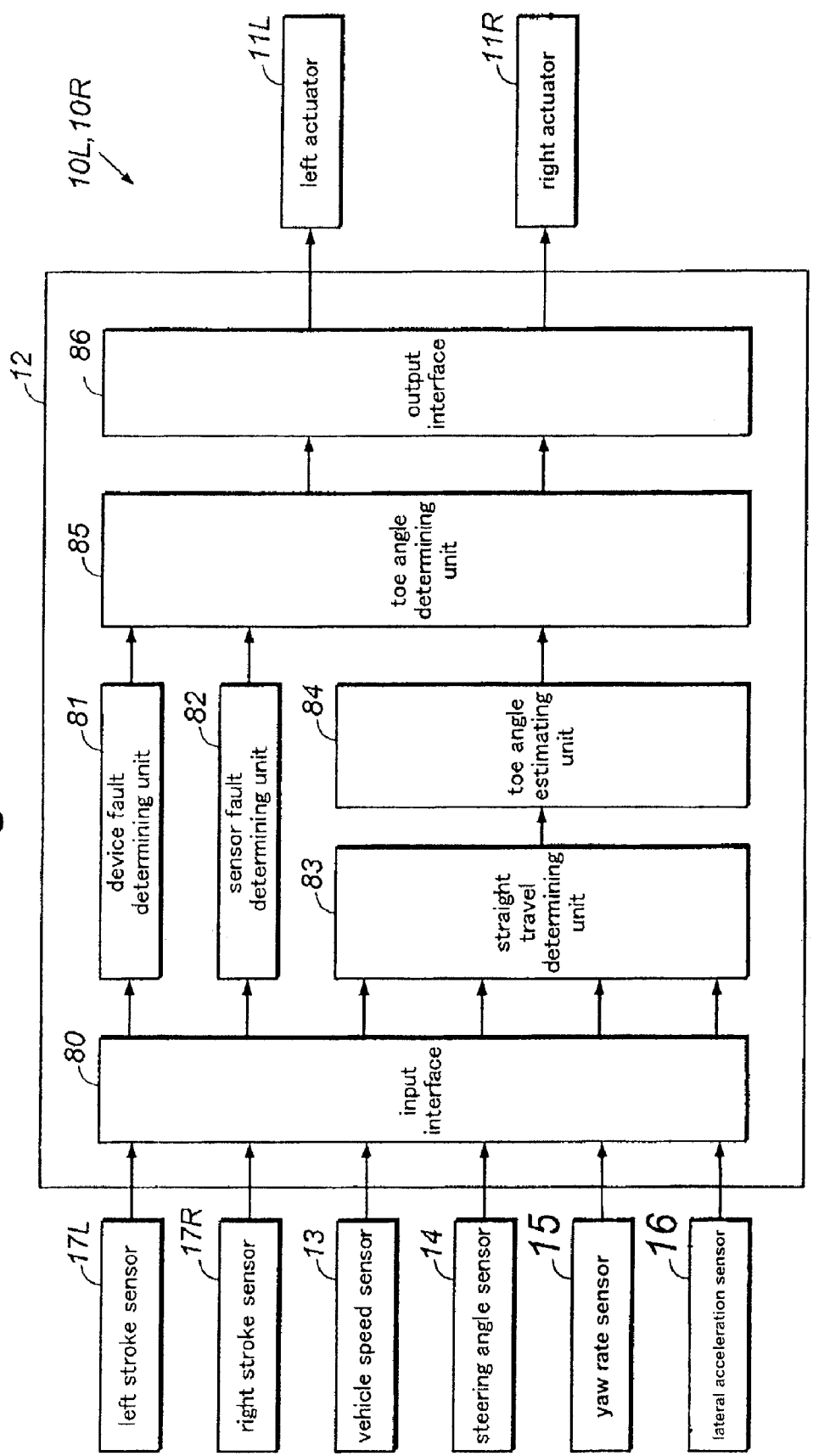
FIG. 5 is a block diagram of the rear wheel toe angle varying device.

FIG. 5 is a block diagram of the rear wheel toe angle varying device 10 for the two rear wheels 5L and 5R. As shown in FIG. 5, the ECU 12 mounted on the vehicle V comprises an input interface 80, a device fault determining unit 81, a sensor fault determining unit 82, a straight travel determining unit 83, a toe angle estimating unit 84, a toe angle determining unit 85 and an output interface 86.

The input interface 80 receives output signals from the stroke sensors 17, vehicle speed sensor 13, steering angle sensor 14, yaw rate sensor 15 and lateral acceleration sensor 16. The device fault determining unit 81 determines a fault in the control action for either one of the electric actuators 11 from the various output signals in addition to the electric currents supplied to the electric actuators 11. The sensor fault determining unit 82 determines a fault in either one of the stroke sensors 17 according to the signals from the stroke sensors 17 and electric currents supplied to the electric actuators 11.

The straight travel determining unit 83 determines that the vehicle V is traveling straight ahead when the outputs from the yaw rate sensor 15 and lateral acceleration sensor 16 are substantially zero, and the vehicle speed detected by the vehicle speed sensor 13 is higher than a prescribed value. The toe angle estimating unit 84 estimates the rear wheel toe angle Adeg of the rear wheel 5 corresponding to the faulty stroke sensor 17 according to the detected value of the steering angle sensor 14 when the vehicle is traveling straight ahead as will be described hereinafter.

The toe angle determining unit 85 determines the prescribed toe angles of the rear wheels 5 for each different control mode according to the determination result of the sensor fault determining unit 81, estimated toe angles obtained from the toe angle estimating unit 84 and output signals of the various sensors 13 to 17. The output interface 86 forwards electric command signals corresponding to the toe angles determined by the toe angle determining unit 85 to corresponding motor control units not shown in the drawings. Thereby, the electric actuators 11 are controlled by the motor control units under the command from the ECU 12.

Figure 6:
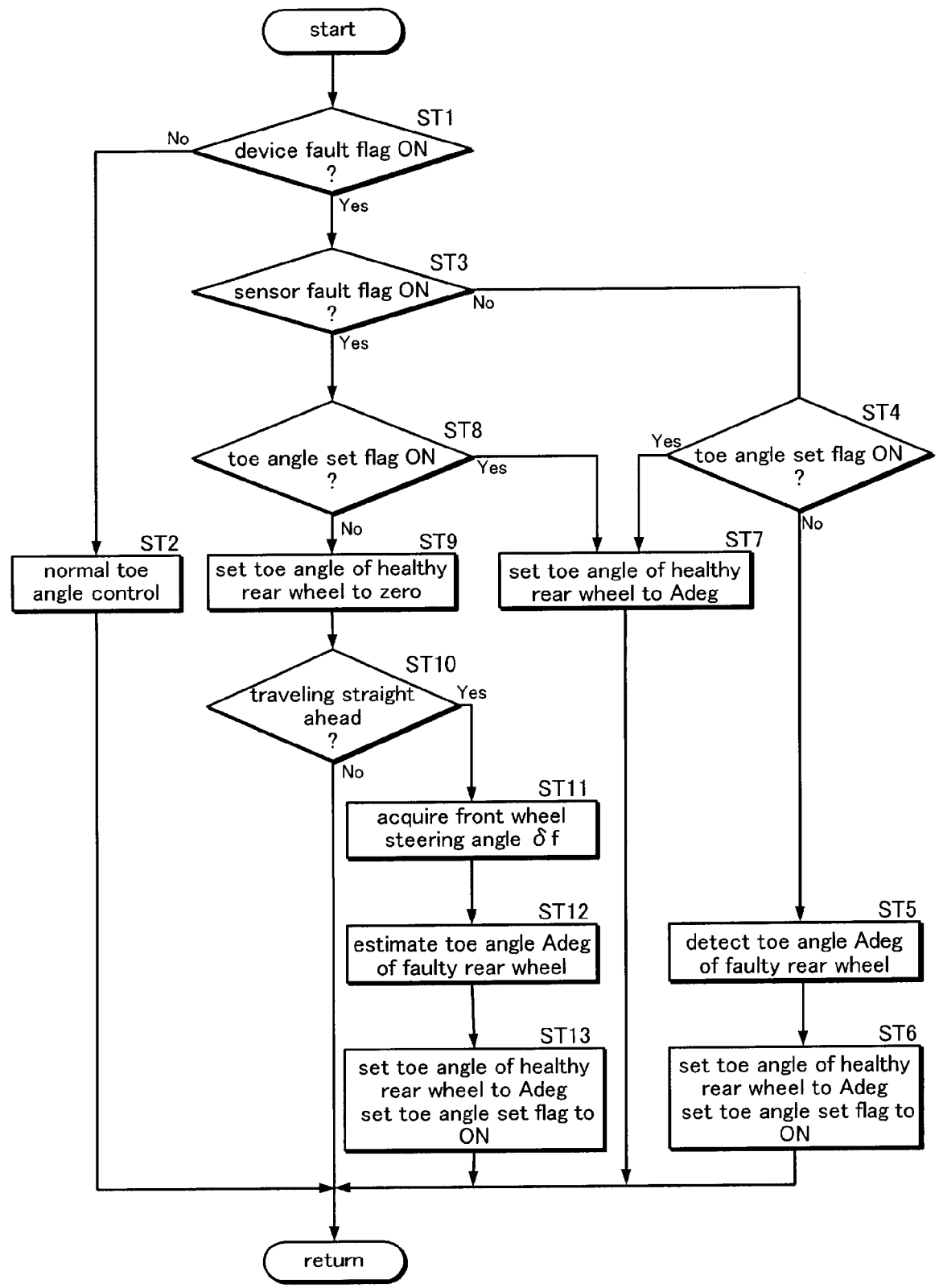
FIG. 6 is a flowchart of a control process executed by a control unit of the rear wheel toe angle varying device given as a first embodiment of the present invention.

The mode of operation of the illustrated embodiment is described in the following with reference to FIG. 6 which is a flowchart of the control process for controlling the rear wheel toe angles of the vehicle V fitted with a rear wheel toe angle varying device according to the present invention. The control process of this flowchart is executed at a prescribed processing interval such as 10 ms once the engine of the vehicle V is started.

First of all, the device fault determining unit 81 of the ECU 12 determines if a device fault flag indicating the occurrence of a fault in either one of the varying units of the rear wheel toe angle varying device 10 is ON (step ST1). If the device fault flag is OFF (No in step ST1), as it means that the rear wheel toe angle varying device is in proper order, the ECU 12 executes a normal toe angle control by using the toe angle determining unit 85 (step ST2). Therefore, according to the dynamic state of the vehicle V detected by the various sensors, the rear wheels 5 are turned (or steered) into a toe-in state, a toe-out state, a same phase state (with respect to the steering angle of the front wheels) or an opposite phase state (with respect to the steering angle of the front wheels). The ECU 12 then repeats the foregoing steps.

If the device fault flag is ON (Yes in step ST1), the sensor fault determining unit 82 of the ECU 12 determines if a sensor fault flag indicating that either one of the stroke sensors 17 is faulty is ON (step ST3). If the sensor fault flag is OFF (No) or if the toe angle varying device is faulty but the stroke sensors 17 are both healthy, the ECU 12 determines if a toe angle set flag indicating that a certain toe angle is assigned to the rear wheel corresponding to the healthy side of the rear wheel toe angle varying device is ON (step ST4).

If the toe angle set flag is OFF in step ST4 (No), the ECU 12 acquires the toe angle (Adeg) of the rear wheel 5 corresponding to the faulty side of the rear wheel toe angle varying device from the detected value of the corresponding stroke sensor 17 (step ST5). If any toe angle is detected in this situation, it is likely that the toe angle is caused by the seizure or other reasons, and the other rear wheels is given with no toe angle. If the vehicle V travels under this condition, the rear tires may be subjected to undesired wear. Therefore, the toe angle determining unit 85 puts the toe angle of the rear wheel of the healthy side to be equal to that of the rear wheel of the faulty side or, in other words, turns the rear wheel of the healthy side parallel to the rear wheel of the faulty side, and sets the toe angle set flag to ON (step ST6). The ECU 12 then repeats the foregoing steps.

If the toe angle set flag is ON in step ST4 (Yes), the ECU 12 holds the toe angle of the rear wheel 5 of the healthy side to that determined in step ST6 (step ST7), and the foregoing steps are repeated.

If the sensor fault flag is ON in step ST3 (Yes), it is impossible to directly detect the toe angle of the rear wheel. In this case, the ECU 12 determines if the toe angle set flag indicating that the rear wheel toe angle of the healthy side is set is ON (step ST8). If the toe angle set flag is ON in step ST8 (Yes) or if the toe angle of the rear wheel of the healthy side is already set, the ECU 12 holds, in step ST7, the toe angle of the rear wheel of the healthy side at the angle (Adeg) determined in step ST 13 as will be described hereinafter, and the foregoing steps are repeated.

If the toe angle set flag is OFF in step ST8 (No) or if the toe angle of the rear wheel corresponding to the healthy stroke sensor is not set, the ECU 12 executes a toe angle estimating action defined in steps ST9 to ST13.

More specifically, by actuating the electric actuator 11, the ECU 12 controls the toe angle of the rear wheel corresponding to the healthy stroke sensor to zero (step ST9). Then, if the straight travel determining unit 83 determines that the vehicle V is not traveling straight ahead in step ST10 (No), the ECU 12 repeats the foregoing steps. By "traveling straight ahead", it means not only that the vehicle V is traveling straight ahead in a normal sense but also that the vehicle V is traveling straight but obliquely at a certain angle with respect to the longitudinal line of the vehicle body by steering the front wheels and rear wheels at a same angle in a same phase (direction).

Figure 7:
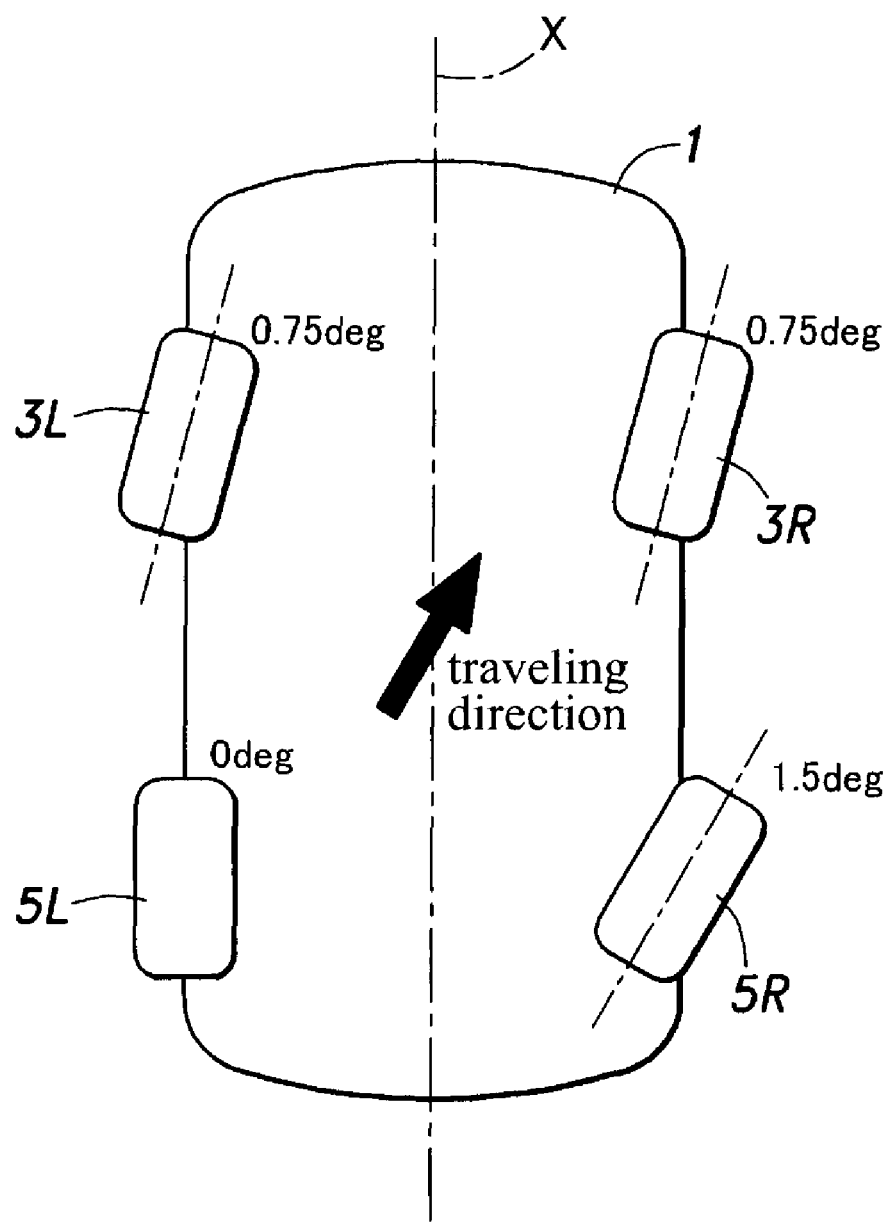
FIG. 7 is a diagram showing a typical case of a fault in the rear wheel toe angle varying device.

If the straight travel determining unit 83 determines that the vehicle is traveling straight ahead in step ST10 (Yes), the ECU 12 reads the output signal of the steering angle sensor 14, and determines the steering angle δf of the front wheels 3 (step ST11). As illustrated in FIG. 7, if the rear wheel corresponding to the faulty stroke sensor 17 is seized or fixed at 1.5 degrees in the toe-out direction (to the right) with respect to the longitudinal line of the vehicle body, for instance, the vehicle is enabled to travel straight ahead by steering the front wheels by about 0.75 degrees to the right. Thereby, the vehicle V is enabled to travel straight at an angle of 0 75 degrees to the right with respect to the longitudinal line X of the vehicle V.

The toe angle estimating unit 84 of the CPU 12 then estimates the rear wheel toe angle Adeg of the side of the faulty stroke sensor (step ST12). As can be understood by generalizing the case illustrated in FIG. 7, the toe angle of the rear wheel corresponding to the faulty side of the rear wheel toe angle varying device is twice the front wheel steering angle 6f because the toe angle of the rear wheel corresponding to the healthy side of the rear wheel toe angle varying device is zero. In the case illustrated in FIG. 7, the front wheel steering angle 6f obtained from the angular position of the steering wheel 8 is 0.75 degrees. Because the toe angle of the rear wheel corresponding to the healthy side of the rear wheel toe angle varying device is zero, the toe angle of the rear wheel corresponding to the faulty side of the rear wheel toe angle varying device can be estimated at 1.5 degrees.

Figure 8:
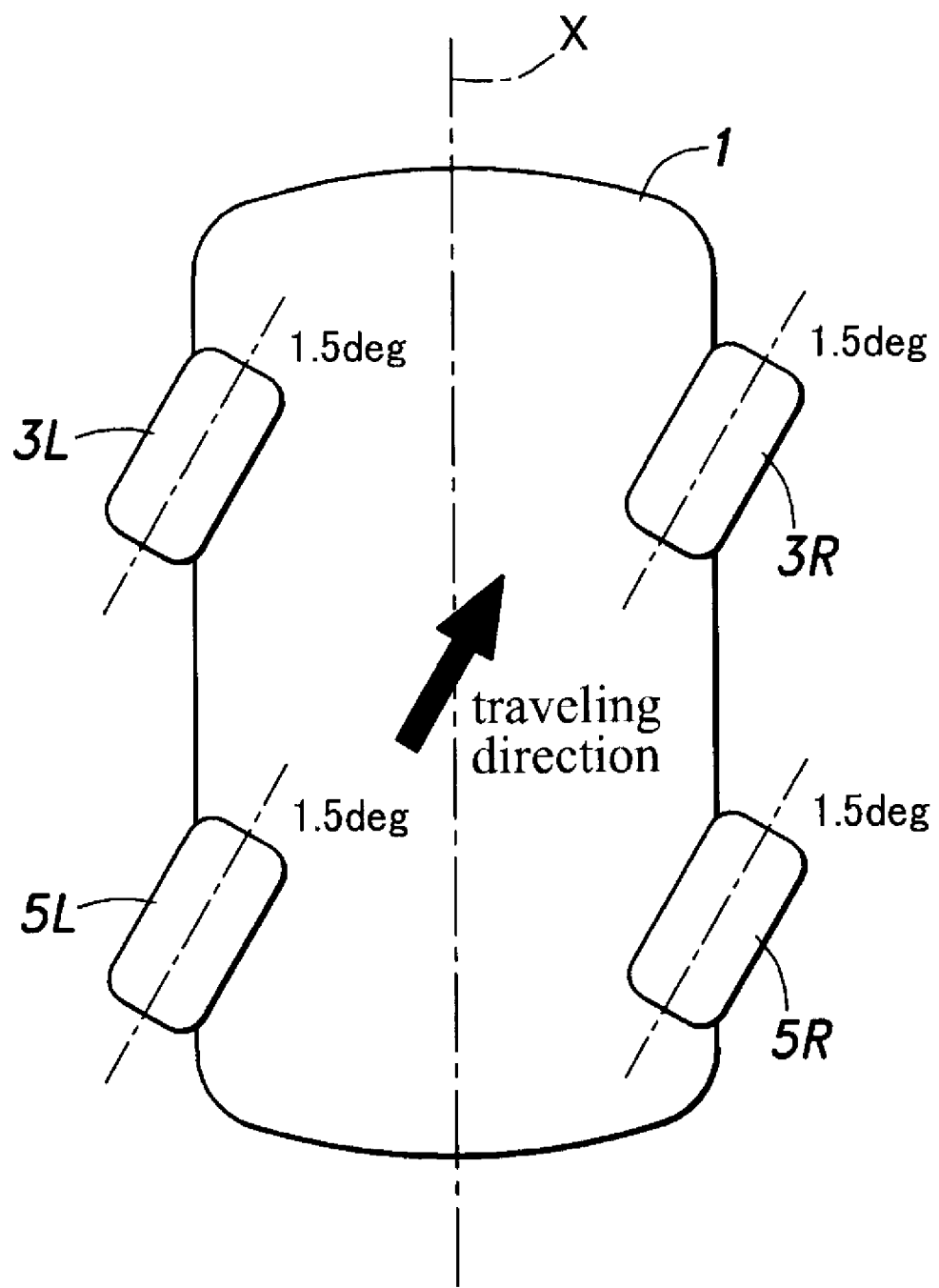
FIG. 8 is a diagram showing a countermeasure provided by the first embodiment of the present invention upon occurrence of a fault as illustrated in FIG. 7.

Even though the vehicle is able to travel straight ahead even under this condition, this condition is not desirable because of the increased wear of the tires of the rear wheels. Therefore, the toe angle determining unit 85 puts the toe angle of the rear wheel of the healthy side to be equal to that of the rear wheel of the faulty side or, in other words, turns the rear wheel of the healthy side parallel to the rear wheel of the faulty side, and sets the toe angle set flag to ON (step ST13). Thereby, as shown in FIG. 8, the rear wheels 5 are both steered by 1.5 degrees to the right parallel to each other, for instance, and the front wheels and rear wheels are all directed in the same direction which may be considered as an effective neutral position. The ECU 12 then repeats the foregoing steps.

Thus, if either one of the varying units of the rear wheel toe angle varying device is faulty, the toe angle Adeg of the rear wheel of the faulty side can be estimated from the stroke sensor of the faulty side. If either one of the strokes sensors is faulty, the toe angle Adeg of the rear wheel of the faulty side can be estimated from the front wheel steering angle by using the toe angle estimating process. In either event, by steering the rear wheel of the healthy side parallel to the rear wheel of the faulty side, the tires of the rear wheels are protected from dragging or undue wear. The vehicle travels at an angle to the longitudinal line of the vehicle body, but all the wheels are directed in the traveling direction.

Figure 9:
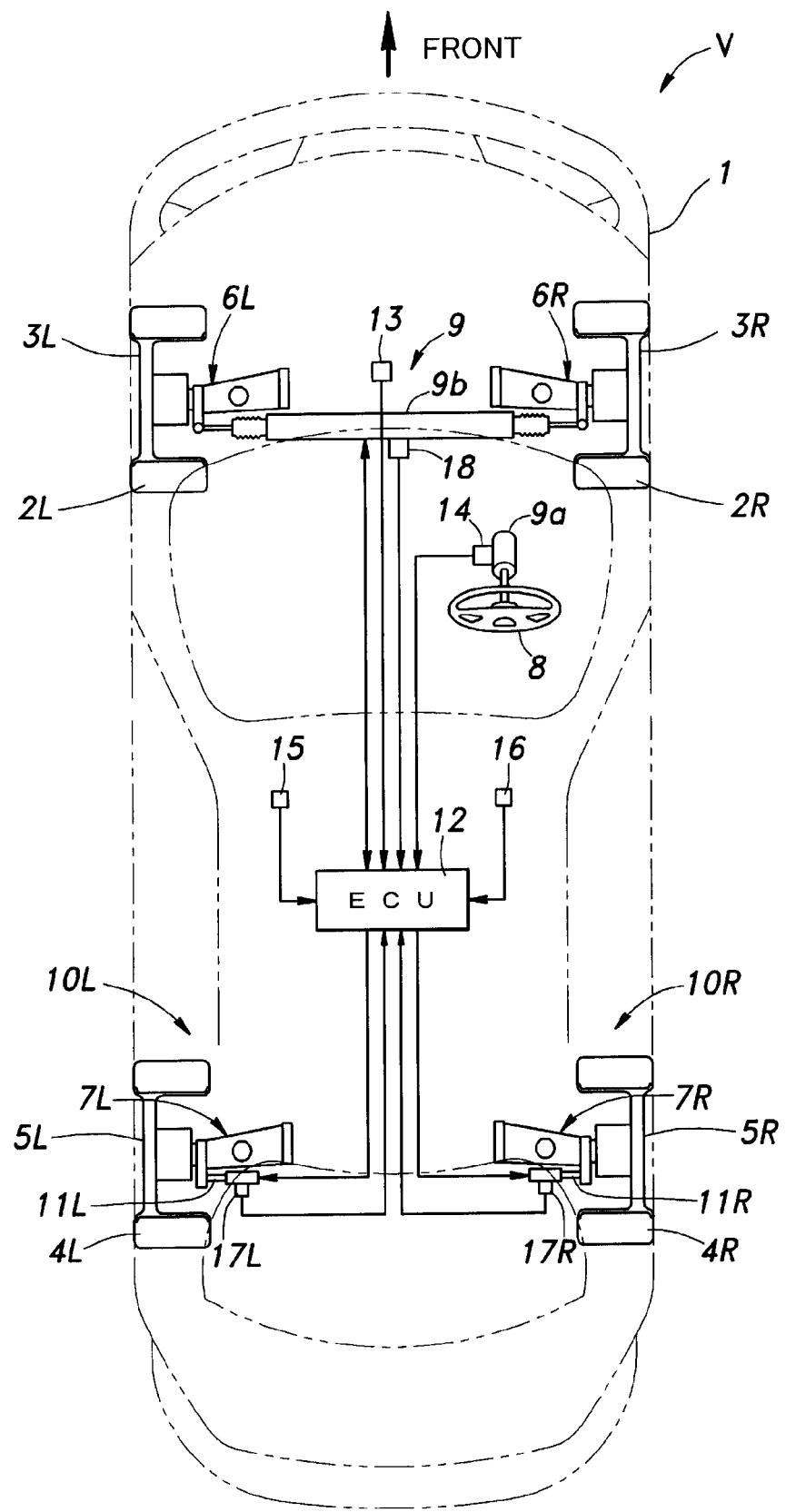
FIG. 9 is a view similar to FIG. 1 showing a second embodiment of the present invention.

FIG. 9 shows a second embodiment of the present invention. The parts corresponding to those of the previous embodiment are denoted with like numerals without repeating the description of such parts. In this embodiment, the steering system consists of a steer-by-wire system in which the steering column 9a supporting the steering wheel 8 is mechanically separated from the steering gear 9b connected to the front wheels 3 so as to electrically actuate them. In this case, the front wheels 3 are steered by the steering gear 9b in dependence on the output value of the steering angle sensor 14 provided on the steering column 9a to detect the angular position of the steering wheel 8. Alternatively, the steering gear 9b may be provided with an actual steering angle sensor 18 that directly measures the steering angle of the front wheels 3.

When a steering wheel steering angle sensor 14 and a road wheel steering angle sensor 18 are both provided, the output signals of both the steering angle sensors 14 and 18 or the output signal of either one of the steering angle sensors 14 and 18 may be used for the estimation of the toe angle of the rear wheel Adeg. It is also possible to do away with the steering wheel steering angle sensor 14, and use only the output signal of the road wheel steering angle sensor 18 for the estimation of the toe angle of the rear wheel Adeg.

Figure 10:
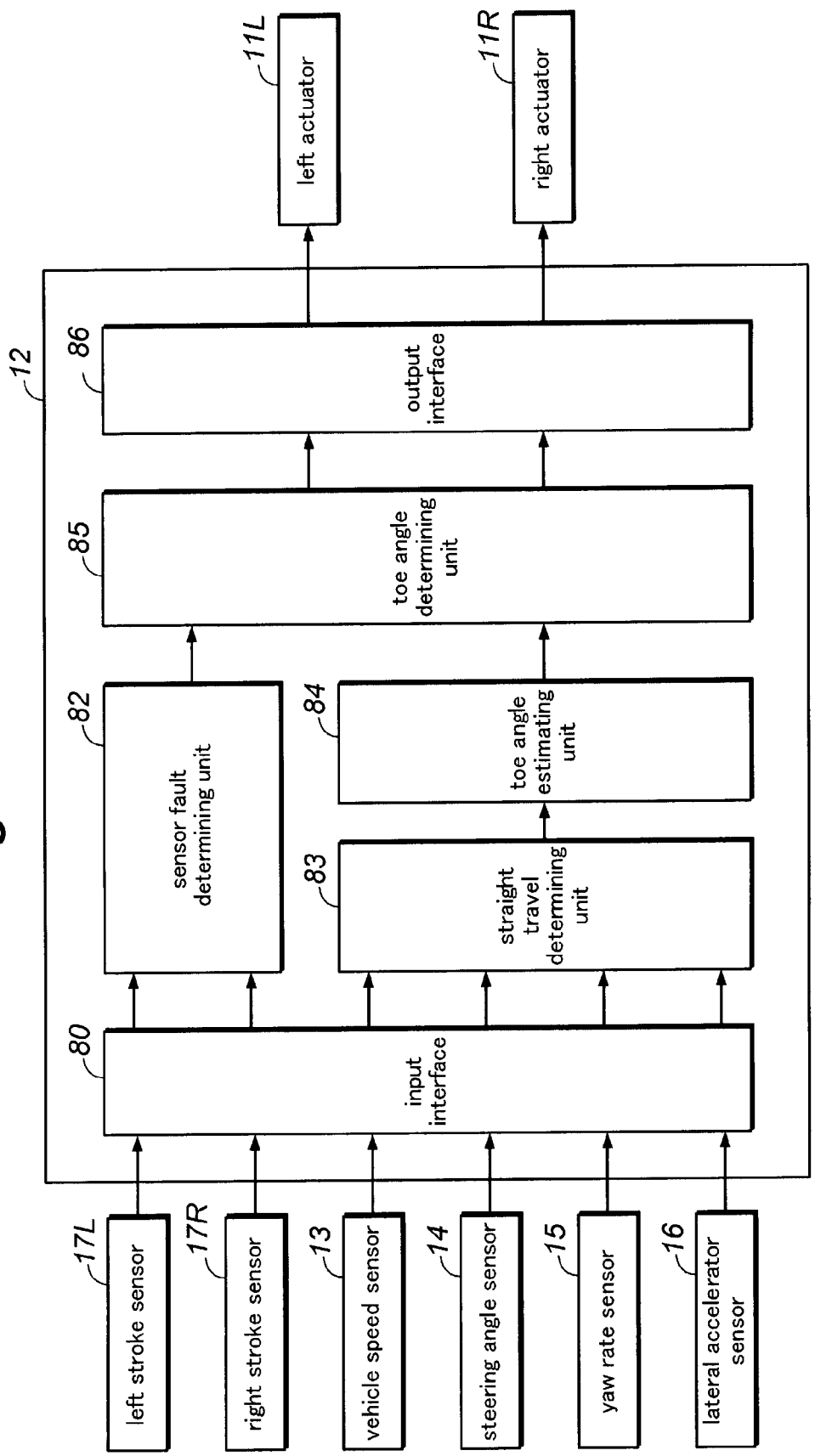
FIG. 10 is a flowchart of a control process executed by the control unit of the rear wheel toe angle varying device given as a third embodiment of the present invention.
Figure 11:
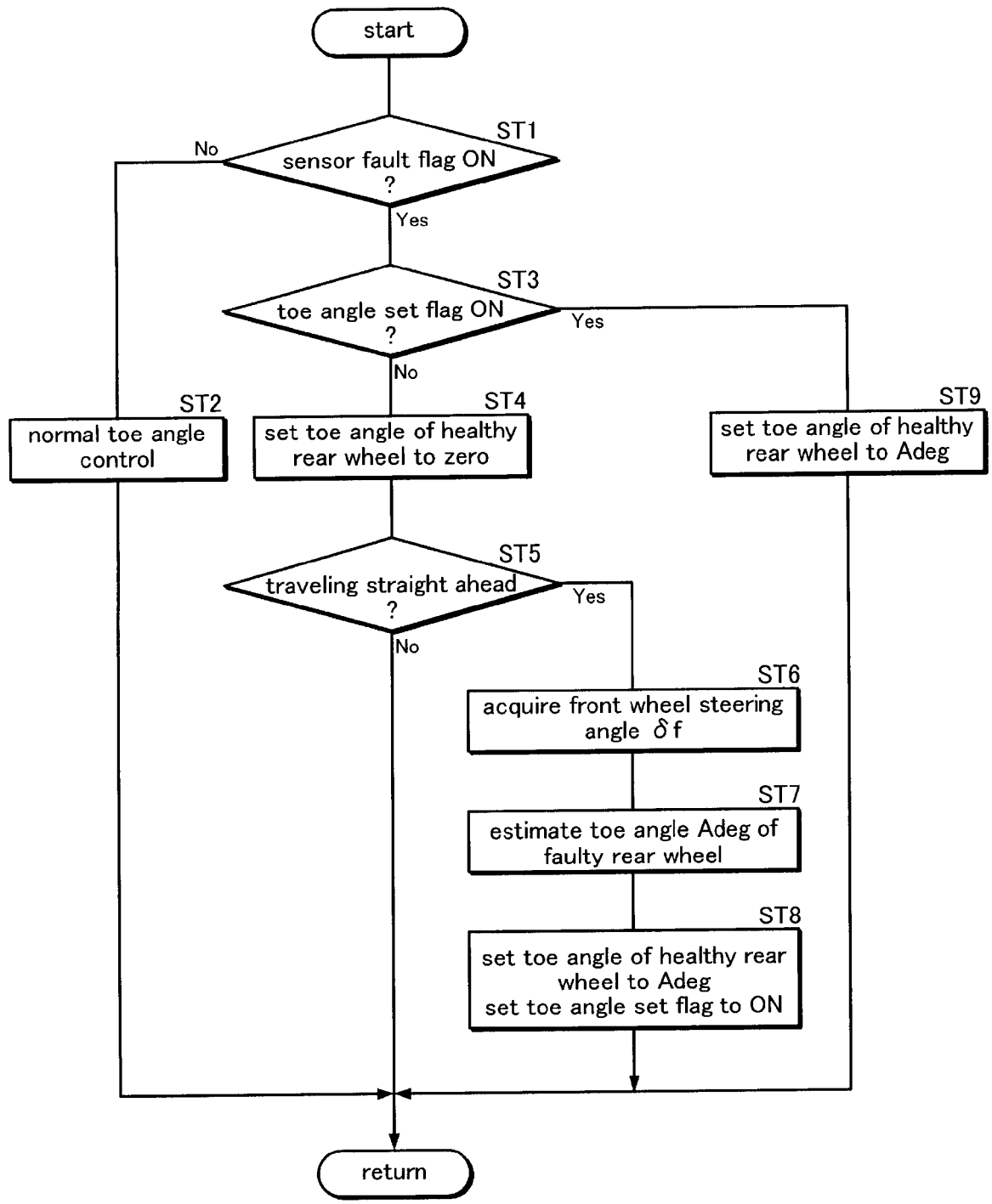
FIG. 11 is a flowchart of a control process executed by the control unit of the rear wheel toe angle varying device given as a fourth embodiment of the present invention.

FIG. 10 illustrates a third embodiment of the present invention. In this embodiment, the parts corresponding to those of the previous embodiments are denoted with like numerals without repeating the description of such parts. As opposed to the first embodiment, the device fault determining unit 81 is omitted. FIG. 11 is a flowchart that illustrates the mode of operation of the third embodiment.

Referring to FIG. 11, first of all, the sensor fault determining unit 82 of the ECU 12 determines if a sensor fault flag indicating the occurrence of a fault in either one of the stroke sensors 17 is ON (step ST1). If the sensor fault flag is OFF (No in step ST1), as it means that both the stroke sensors 17 are in proper order, the ECU 12 executes a normal toe angle control by using the toe angle determining unit 85 (step ST2). Therefore, according to the dynamic state of the vehicle V detected by the various sensors, the rear wheels 5 are turned (or steered) into a toe-in state, a toe-out state, a same phase state (with respect to the steering angle of the front wheels) or an opposite phase state (with respect to the steering angle of the front wheels). The ECU 12 then repeats the foregoing steps.

If the sensor fault flag is ON (Yes in step ST1), it is impossible to directly detect the toe angles of the rear wheels. In this case, the ECU 12 determines if the toe angle set flag indicating that the rear wheel toe angle of the healthy side is set is ON (step ST3). If the toe angle set flag is ON in step ST3 (Yes) or if the toe angle of the rear wheel of the healthy side is already set, the ECU 12 holds, in step ST9, the toe angle of the rear wheel of the healthy side at the angle (Adeg) determined in step ST 8 as will be described hereinafter, and the foregoing steps are repeated.

If the toe angle set flag is OFF in step ST3 (No) or if the toe angle of the rear wheel corresponding to the healthy stroke sensor is not set, the ECU 12 executes a toe angle estimating action defined in steps ST4 to ST8.

More specifically, by actuating the electric actuator 11, the ECU 12 controls the toe angle of the rear wheel corresponding to the healthy stroke sensor to zero (step ST4). Then, if the straight travel determining unit 83 determines that the vehicle is not traveling straight ahead in step ST5 (No), the ECU 12 repeats the foregoing steps. By "traveling straight ahead", it means not only that the vehicle is traveling straight ahead in a normal sense but also that the vehicle is traveling straight but obliquely at a certain angle with respect to the longitudinal line of the vehicle body by steering the front wheels and rear wheels at a same angle in a same phase (direction).

If the straight travel determining unit 83 determines that the vehicle V is traveling straight ahead in step ST5 (Yes), the ECU 12 reads the output signal of the steering angle sensor 14, and determines the steering angle δf of the front wheels 3 (step ST6). As illustrated in FIG. 7, if the rear wheel corresponding to the faulty stroke sensor is seized or fixed at 1.5 degrees in the toe-out direction (to the right) with respect to the longitudinal line of the vehicle body, for instance, the vehicle V is enabled to travel straight ahead by steering the front wheels by about 0.75 degrees to the right. Thereby, the vehicle V is enabled to travel straight at an angle of 0.75 degrees to the right with respect to the longitudinal line of the vehicle V.

The toe angle estimating unit 84 of the CPU 12 then estimates the rear wheel toe angle Adeg of the side of the faulty stroke sensor (step ST7). As can be understood by generalizing the case illustrated in FIG. 7, the toe angle of the rear wheel corresponding to the faulty side of the rear wheel toe angle varying device is twice the front wheel steering angle δf because the toe angle of the rear wheel corresponding to the healthy side of the rear wheel toe angle varying device is zero. In the case illustrated in FIG. 7, the front wheel steering angle δf obtained from the angular position of the steering wheel 8 is 0.75 degrees. Because the toe angle of the rear wheel corresponding to the healthy side of the rear wheel toe angle varying device is zero, the toe angle of the rear wheel corresponding to the faulty side of the rear wheel toe angle varying device can be estimated at 1.5 degrees.

Even though the vehicle V is able to travel straight ahead even under this condition, this condition is not desirable because of the increased wear of the tires of the rear wheels 5. Therefore, the toe angle determining unit 85 puts the toe angle of the rear wheel of the healthy side to be equal to that of the rear wheel of the faulty side or, in other words, turns the rear wheel of the healthy side parallel to the rear wheel of the faulty side, and sets the toe angle set flag to ON (step ST8). Thereby, as shown in FIG. 8, the rear wheels 5 are both steered by 1.5 degrees to the right parallel to each other, for instance, and the front wheels and rear wheels are all directed in the same direction which may be considered as an effective neutral position. The ECU 12 then repeats the foregoing steps.

Thus, if either one of the stroke sensors is faulty, the toe angle Adeg of the rear wheel of the faulty side can be estimated from the front wheel steering angle by using the toe angle estimating process. Thus, by steering the rear wheel of the healthy side parallel to the rear wheel of the faulty side, the tires of the rear wheels are protected from dragging or undue wears. The vehicle travels at an angle to the longitudinal line of the vehicle body, but all the wheels are directed in the traveling direction.

Figure 12:
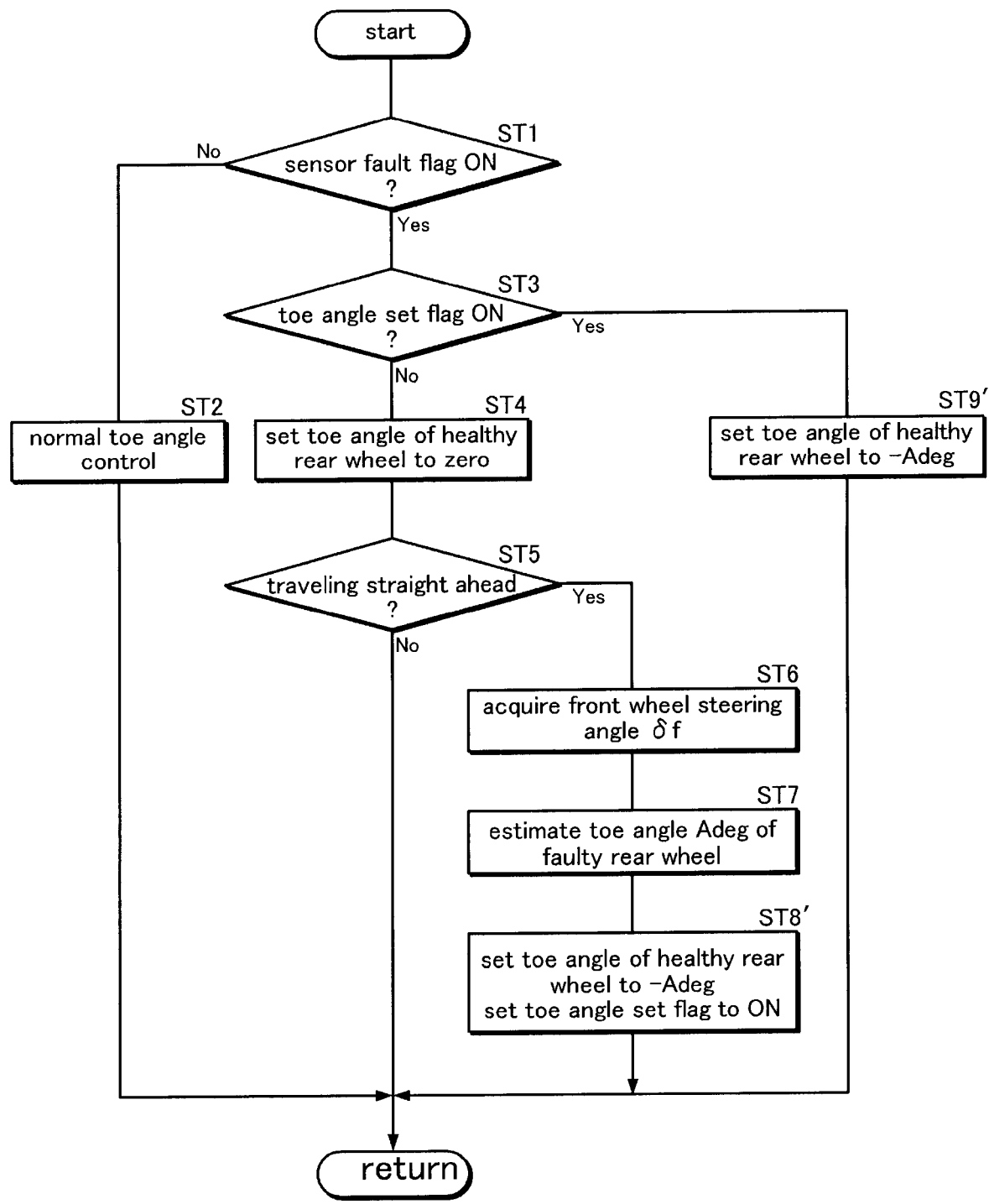
FIG. 12 is a diagram showing a countermeasure provided by the fourth embodiment of the present invention upon occurrence of a fault as illustrated in FIG. 7.

FIG. 12 shows a fourth embodiment which is slightly modified from the third embodiments. In the fourth embodiment, the steps that are similar to or correspond to those of the third embodiment are denoted with same step numbers without repeating the description of such parts. In step ST8' of this embodiment, the ECU 12 steer the rear wheel 5 on the side of the healthy stroke sensor to an angle −Adeg which is equal to the estimated rear wheel toe angle in absolute value but opposite thereto in sign. In step ST9', the ECU 12 holds the toe angle of the rear wheel of the healthy side at the angle (−Adeg) determined in step ST 8, and the foregoing steps are repeated.

Figure 13:
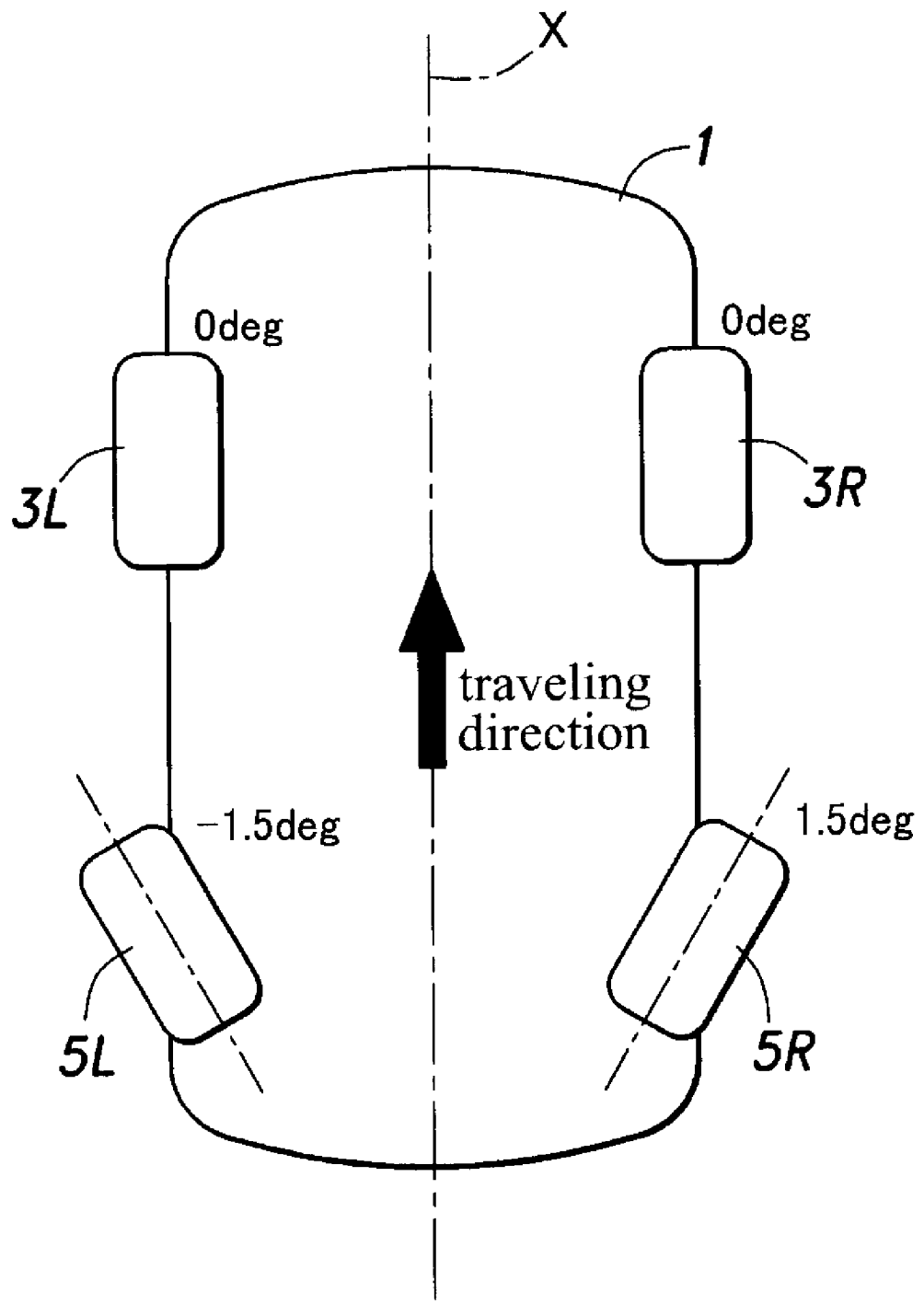
FIG. 13 is a diagram showing two rear wheels being steering in different directions.

As a result, the two rear wheels are symmetric to each other, and are given with a toe in or toe out configuration. In the example illustrated in FIG. 13, the two rear wheels are steered in different directions or in different phases to each other by an angle of 1.5 degrees. As the lateral forces produced by the rear wheels are opposite in direction and identical in magnitude, the rear wheels follow a straight ahead path even when the front wheels are at zero steering angle. Thereby, even though the tires of rear wheels are subjected to somewhat excessive wear, the vehicle V is allowed to travel straight in a direction parallel to the longitudinal axial line of the vehicle body.

Although the present invention has been described in terms of preferred embodiments thereof, it is obvious to a person skilled in the art that various alterations and modifications are possible without departing from the scope of the present invention which is set forth in the appended claims.

The contents of the original Japanese patent application on which the Paris Convention priority claim is made for the present application are incorporated in this application by reference.

The invention claimed is:

1. A vehicle provided with a rear wheel toe angle varying device for individually varying toe angles of rear wheels, the rear wheel toe angle varying device comprising:
   a pair of drive units for steering the rear wheels;
   at least one sensor for detecting a dynamic state of the vehicle;
   a control unit for controlling the drive units according to an output of the dynamic state of the vehicle from the sensor; and
   a monitoring unit for detecting a failure to steer a rear wheel as controlled by the control unit;
   wherein the control unit is configured such that, upon detection of a failure to steer a rear wheel, the rear wheel of an opposite, healthy side is steered to a zero angle;
   a steering angle sensor for detecting a steering angle of front wheels of the vehicle, a straight travel determining unit for determining that the vehicle is traveling straight ahead, and a toe angle estimating unit that, upon occurrence of a failure of said control unit to steer one of the rear wheels, and the rear wheel of the opposite, healthy side being steered to a zero angle by said control unit, estimates a steering angle of the rear wheel of a faulty side from the steering angle of the front wheels when the straight travel determining unit determines the vehicle is traveling straight ahead.

2. The vehicle provided with a rear wheel toe angle varying device according to claim 1, wherein the monitoring unit for detecting a failure to steer each rear wheel is configured to detect a fault in a stroke sensor that detects an actual steered angle of the corresponding rear wheel.

3. The vehicle provided with a rear wheel toe angle varying device according to claim 1, wherein the monitoring unit for detecting a failure to steer each rear wheel is configured to detect a fault in a power actuator for steering each rear wheel.

4. The vehicle provided with a rear wheel toe angle varying device according to claim 1, wherein the monitoring unit for detecting a failure to steer each rear wheel is configured to detect a fault in a part of the control unit responsible for steering each rear wheel.

5. The vehicle provided with a rear wheel toe angle varying device according to claim 1, wherein the toe angle estimating unit estimates the steering angle of the rear wheel of the faulty side to be one half of the steering angle of the front wheels.

* * * * *